No. 727,610. PATENTED MAY 12, 1903.
E. F. GALLOWAY, Jr.
RIVET CUTTER.
APPLICATION FILED MAR. 7, 1903.
NO MODEL.

Witnesses:
Samuel W. Balch
Richard S. Harvey

Inventor,
Edwin F. Galloway, Jr.
by Thomas C. ___
Attorney

No. 727,610. Patented May 12, 1903.

UNITED STATES PATENT OFFICE.

EDWIN F. GALLOWAY, JR., OF NEWARK, NEW JERSEY, ASSIGNOR TO EMPIRE ENGINE AND MOTOR COMPANY, A CORPORATION OF NEW YORK.

RIVET-CUTTER.

SPECIFICATION forming part of Letters Patent No. 727,610, dated May 12, 1903.

Application filed March 7, 1903. Serial No. 146,608. (No model.)

*To all whom it may concern:*

Be it known that I, EDWIN F. GALLOWAY, Jr., a citizen of the United States of America, and a resident of Newark, county of Essex, and State of New Jersey, have invented certain new and useful Improvements in Rivet-Cutters, of which the following is a specification.

The object of this invention is to produce a cutter for conveniently severing the heads of bolts and rivets from their shanks, particularly when in place in an iron or steel structure—such, for example, as the frame for a building, a bridge, a steam-boiler, or other structure composed of bolted or riveted metal plates, pipes, and the like which are to be taken apart or from which the removal of certain rivets or bolts is required. In attaining these objects the cutter is designed so that the power will be applied at a suitable point and in a convenient manner, either by hand or by power mechanism, and transmitted through the mechanism of the rivet-cutter with great mechanical advantage. The rivet-cutter is designed so that it will occupy little space notwithstanding the power which is required to transmit and apply and will form a compact and portable device.

A further object is to so design the rivet-cutter that the pivot-points of the jaws may be at a considerable distance from the cutting edges, whereby the movement of the cutting edges will more nearly follow a right line in biting into the rivet which is being severed, and consequently the rivet-cutter will not in its operation mar or injure the plates in which the rivet is contained.

Figure 1:
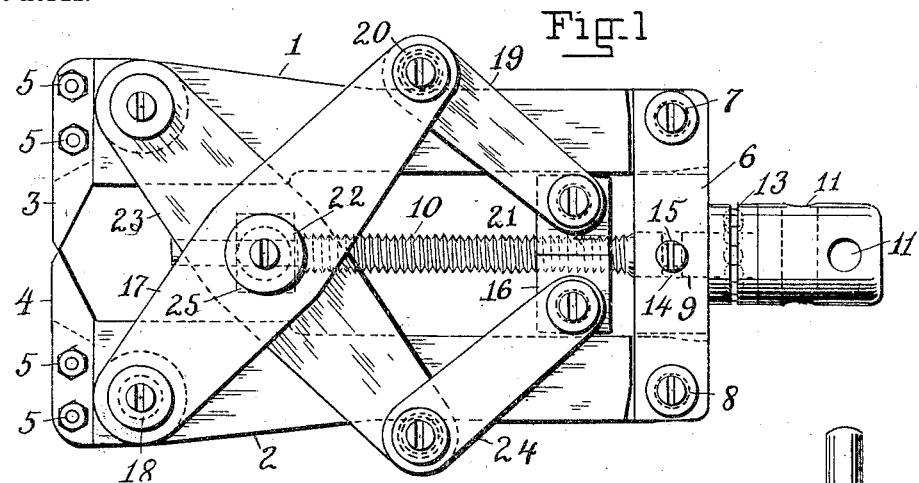
Figure 2:
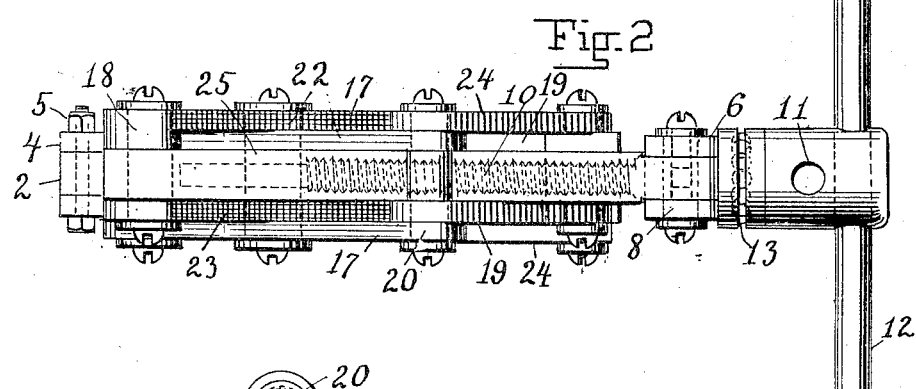
Figure 3:
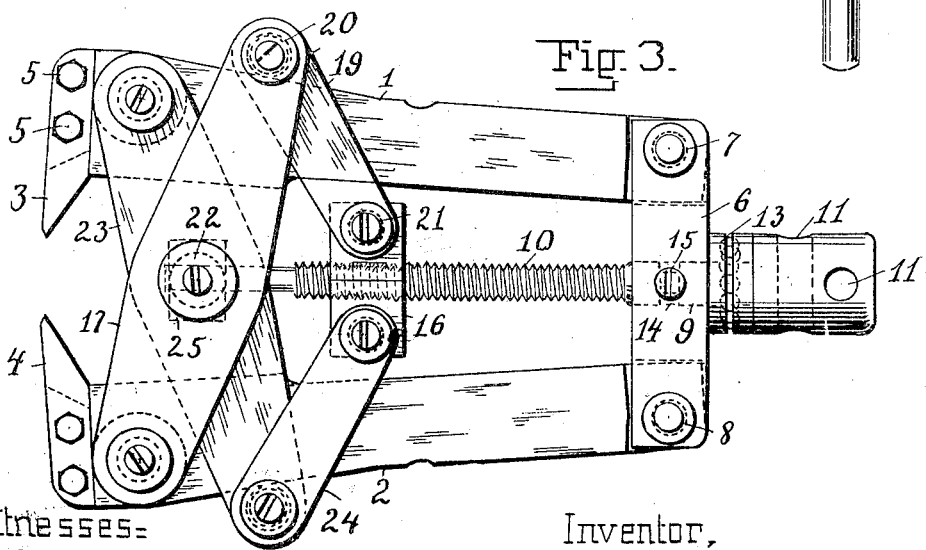

In the accompanying sheet of drawings, which form a part of this specification, Figure 1 is a side view of the rivet-cutter, showing the position of the parts when the jaws are closed. Fig. 2 is an edge view of the cutter with the parts as in Fig. 1. Fig. 3 is a side view of the rivet-cutter, showing the position of the parts when the jaws are open.

The rivet-cutter comprises two jaws 1 2, with cutting-blades 3 4, preferably of hardened steel and bolted to the jaws by the bolts 5 5. The jaws are pivoted at the opposite ends from the blades to a pivot-head 6. When the jaws are closed, their shanks are substantially parallel. The pivot-head is forked to receive the ends of the jaws, and pins 7 8 pass through the forks and jaws to form the pivots. The pivot-head also affords a journal 9 for a power-screw 10. The journal lies between the pivots for the jaws. The jaws are preferably pivoted to the head by separate pins in order that the jaws may be symmetrically placed with respect to the screw. The head of the screw has transverse holes 11, in which a hand-lever 12 is inserted for the operation of the mechanism of the rivet-cutter. The screw-head seats against the pivot-head through an interposed ball-bearing 13, which takes the thrust when the rivet-cutter is operated to cut off a bolt-head or rivet. The screw-shank inside the bearing in the pivot-head contains a groove 14, which is engaged by the point of a small set-screw 15 to keep the power-screw from sliding out from its bearing in the pivot-head. The screw operates a traveling block 16, which lies between the jaws and has a movement parallel with the direction of the jaws when they are closed. This movement is in a direction to and from the pivot-head, and the traveling block is therefore spaced with respect to the pivot-head by the screw, which is threaded in one of these parts and preferably, as shown, in the traveling-block. The traveling block by its movement operates the jaws through a lever-and-link system, which is duplicated in a substantially symmetrical manner on each side of the jaws, thereby making a fourfold system of connections between the traveling block and the jaws. Each system comprises a lever 17, which is connected at one end with a point on one of the jaws between the pivot of the jaw and its cutting-blade and preferably close to the blade. This connection may be of any suitable character. In the form shown this connection is made directly to the jaw by a pin 18. The lever is connected at the other end with the traveling block. This connection is by a link 19, which is pinned to the lever by a pin 20 and to the block by a pin 21. At a point intermediate between the point of connection to the link and the point of connection to the jaw this lever is suitably fulcrumed by a pin 22 to a part 23, which connects it to the other jaw.

The elements thus far enumerated are sufficient for the operative connection of the traveling block and jaws; but in the form as illustrated this part 23 is the lever of a duplicate and symmetrically-disposed system of connections consisting of this lever and the link 24. In consequence there are crossed levers which are fulcrumed to each other; but it is not essential to the principle of operation that the fulcrum connection of the lever 17 with the jaw 1 should be a complete lever, although by making it such it serves the double purpose of acting as a fulcrum for one of the systems of connection and as an integral part of a second symmetrical system in balance relation, so that the side strains of the link connections of the two systems with the traveling block will be opposed and the power-screw relieved of all transverse strain. The power-screw can therefore be of small diameter to reduce the friction.

The systems of connection as described are duplicated on the opposite sides of the jaws, so that the drawings serve as a true representation of the rivet-cutter viewed from either side. The several pins 18, 20, 21, and 22 are extended to the opposite side of the jaws, and their other ends serve to connect the systems of levers and links on the other side. The pin 22 has an enlarged middle portion 25, through which is a transverse hole, in which the end of the power-screw is steadied.

What I claim as new, and desire to secure by Letters Patent of the United States, is—

1. The combination of a pivot-head, cutting-jaws pivoted thereto, a traveling block, a lever, connections from points between the pivot and cutting ends of each jaw to the lever, connections between the traveling block and the lever, and a power-screw for spacing the block with respect to the pivot-head, substantially as described.

2. The combination of a pivot-head, cutting-jaws pivoted thereto, a traveling block, two crossed levers, connections from points between the pivot and cutting ends of each jaw to both levers, opposed connections between the traveling block and the levers, and a power-screw for spacing the block with respect to the pivot-head, substantially as described.

3. The combination of a pivot-head, cutting-jaws pivoted thereto, a traveling block, crossed levers fulcrumed to each other, connections from points between the pivot and cutting ends of each jaw and the levers, opposed connections between the traveling block and the levers, and a power-screw for spacing the block with respect to the pivot-head, substantially as described.

4. The combination of a pivot-head, cutting-jaws pivoted thereto, a traveling block, levers on opposite sides of the cutting-jaws, connections from points between the pivot and cutting ends of each jaw and the levers, connections between the traveling block and the levers, and a power-screw for spacing the block with respect to the cutting-head, substantially as described.

Signed at New York city, borough of Manhattan, New York, this 3d day of March, 1903.

EDWIN F. GALLOWAY, Jr.

Witnesses:
SAMUEL W. BALCH,
GEORGE H. GILMAN.